June 18, 1963 W. L. LEHNER ETAL 3,094,651

ROLLED CAPACITOR STRUCTURE

Filed Dec. 16, 1958 2 Sheets-Sheet 1

INVENTORS
William L. Lehner
Milan L. Lincoln
BY
Robert E. Strausser
ATTORNEY

ROLLED CAPACITOR STRUCTURE

Filed Dec. 16, 1958 2 Sheets-Sheet 2

INVENTORS
William L. Lehner
Milan L. Lincoln
BY
Robert E. Strausser
ATTORNEY 3,094,651
Patented June 18, 1963

3,094,651

ROLLED CAPACITOR STRUCTURE

William L. Lehner, Snyder, and Milan L. Lincoln, Batavia, N.Y., assignors, by mesne assignments, to Sylvania Electric Products Inc., Wilmington, Del., a corporation of Delaware Filed Dec. 16, 1958, Ser. No. 780,826
3 Claims. (Cl. 317—260)

This invention generally relates to electrical components such as capacitors of the tubular type and more particularly to capacitors formed as a roll of laminae having conductive foils or plates separated from one another by strips of dielectric material.

Capacitors of the rolled foil type are generally made by winding a laminae of alternately disposed conductive and dielectric strips to form a tubular body having the desired capacitance. It has been the practice to connect the external capacitor leads to the roll as well as the edges of the conductive layer turns to one another by means of a solder connection. This type of connection has not proved satisfactory since it is expensive and difficult to make, and since the joint is very weak and is thereby readily broken. To provide an improved connection, it has been proposed that a reasonably large body of solder be built up around the edges of a conductive foil wound on a solid insulating core. This body of solder and the core has a hole drilled therein for receiving the external conductive foil leads. Although the external leads in such a structure are not easily broken away from the capacitor, the connection between the solder and the foil edges is still undesirably weak. In addition, the costs and difficulties inherently involved in a soldering operation is still present.

Additional problems and costs are involved when the conductive foils are not normally solderable. In this instance a solder alloy is used to produce a paste or glue type joint, which is electrically suitable but mechanically weak. The disadvantages referred to in conjunction with the solder connections are magnified when a glue type joint is employed.

Accordingly, an object of the invention is to reduce the aforementioned disadvantages and to reduce capacitor failures due to improper or broken connections.

A further object is to simplify and improve the fabrication of capacitors.

The foregoing objects are achieved in one aspect of the invention by the provision of a tubular roll foil capacitor having external leads penetrating directly into the roll to provide contacts with the foil turns. An external insulating casing is formed about the roll. The capacitor is made by winding a desired length of a laminae comprising alternate foil and dielectric layers to provide the roll. The external leads are then forced into the roll or are pressed into pre-pierced apertures. Subsequently the roll of laminae is encased in the insulating and moisture repellent material.

For a better understanding of the invention, reference is made to the following description taken in conjunction with the accompanying drawings in which.

Figures 1, 2, 3:
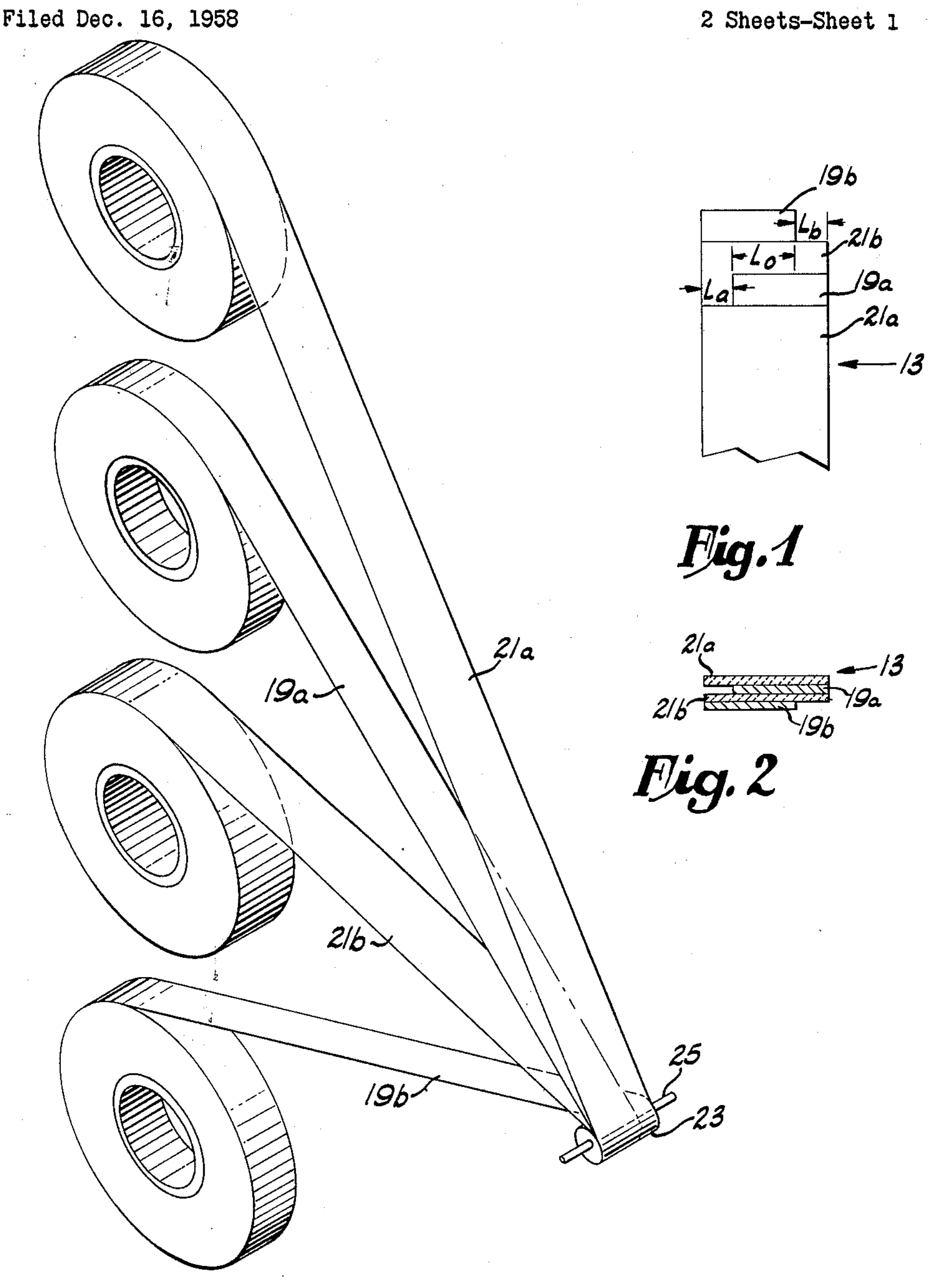
FIG. 1 is a plan view of the laminae used to form the capacitor.
FIG. 2 is a sectional view of the laminae shown in FIG. 1.
FIG. 3 illustrates the manner in which the capacitor roll is formed.

Referring to the drawings, capacitor 11 is shown comprising a roll of a laminae 13 inclosed within an electrically insulating and moisture repellent casing 15. External electrical leads of tin or tinned copper are formed to extend from the casing generally in the longitudinal direction. This capacitor structure is well adapted for use with a printed circuit board type of electrical chassis (not shown) since it can be mounted upon the board in an upright position to facilitate automatic capacitor handling and insertion of the leads through the apertures normally provided in the boards.

The conductive foils 19*a* and 19*b* in laminae 13 may comprise any solderable or non-solderable metal such as aluminum, tin, copper, steel, etc. while the dielectric strips 21*a* and 21*b* comprise electrical insulative materials such as paper or commercially available polyester films such as Mylar, which is marketed by E. I. DuPont de Nemours Co.

The insulating and moisture repellent casing material 15 may be made of any conventional material such as a wax composition, tape, or plastics like epoxy resins combined with a hardener and filler. For instance, commercially available Houghton Laboratories Hyson #6020–156, Hardner BP–1, is an example of a resin composition which has been satisfactorily employed in capacitor 11.

In the fabrication of the capacitor, roll 23 of laminae 13 is formed by winding from spools the alternate layers of foils 19*a* and 19*b* and dielectrics 21*a* and 21*b* about spindle 25 as shown in FIG. 3. It has been found preferable, after the desired length of foil capable of providing the desired capacitance has been wound, to cut the layers in such a manner that the last several turns of the roll comprises only the dielectric layers. These last turns allow coverage for the foil ends in addition to providing sufficient dielectric length for fastening purposes so that the roll will not unwind. An adhesive material may be used to seal the last turn of layers 21*a* or 21*b* to the roll or, if a polyester film of the type described above is used, a heat sealing operation of the dielectric to itself may be performed to accomplish the desired adhesion.

Referring to FIGS. 1 and 2, it can be seen that foils 19*a* and 19*b* have a width less than the width of interleaving dielectric strips 21*a* and 21*b*. The edges of the two foils are disposed at opposite sides of the dielectrics to provide a foil overlapping portion $L_0$, and edge portions $L_a$ and $L_b$ offset from the overlapping portion. With such a structure, the external lead 17 associated with, for instance, foil 19*b*, is inserted into roll 23 within the offset portion $L_a$ while the lead for 19*a* is inserted within the $L_b$ portion. Therefore, leads 17 are connected to their appropriate condenser plates within roll 23 without contacting or shorting with the other plate or foil. The overlapping portion $L_0$ of foils 19*a* and 19*b* is the effective plate area which primarily determines the capacitance value of the condenser.

Figures 4, 5, 6, 7:
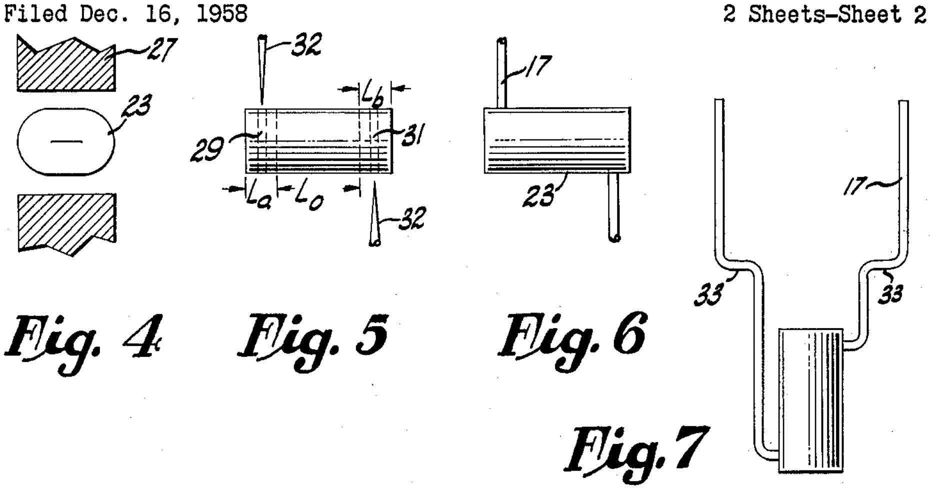
FIGS. 4 through 9 illustrate the process steps of making a capacitor from the roll of laminae.

After roll 23 has been made, it is removed from spindle 25 and then flattened by tools 27 to collapse the air core formed by removal of the spindle as shown in FIG. 4. The spindle hole is collapsed to prevent separation of the loose inner ends of the laminae and to provide a compact unit. Subsequently, apertures 29 and 31 are pierced in offset portions $L_a$ and $L_b$ respectively by tools 32 at positions spaced from the overlapping portion $L_0$, FIG. 5. The external leads 17 are then pressed into the roll to frictionally contact and provide the connections for foils 19*a* and 19*b*, see FIG. 6. For best electrical contact, the diameter of apertures 29 and 31 should be slightly smaller than the diameters of leads 17.

It has been found preferable, although not necessary, to have leads 17 extend completely through roll 23 and thereby into contact with each side of each turn of its associated foil. This large number of contacts with the foil minimizes the inductance of the condenser. However, satisfactory results have been obtained by passing the leads 17 only part of the way through the roll.

Instead of piercing apertures 29 and 31 in roll 23 and then pressing leads 17 therein, these leads may be pointed and pressure driven into the roll without utilizing any pre-pierced apertures. This latter technique is well adapted to automatic production techniques.

The leads 17 which have been inserted into the roll extend therefrom transverse to the longitudinal axis of the roll. Subsequently, these leads may be bent or formed in any given manner calculated to satisfy the requirements under which the condenser will be ultimately employed. For instance, when condenser 11 is to be used with a printed circuit type chassis board (not shown), it is advantageous to bend leads 17 in the manner shown in FIG. 7 so that the ends of the leads are extended generally in the longitudinal direction. Shoulders 33 are, in this instance, provided intermediate roll 23 and the ends of leads 17 to facilitate moulding or casting as will be hereafter described.

Figures 8, 9:
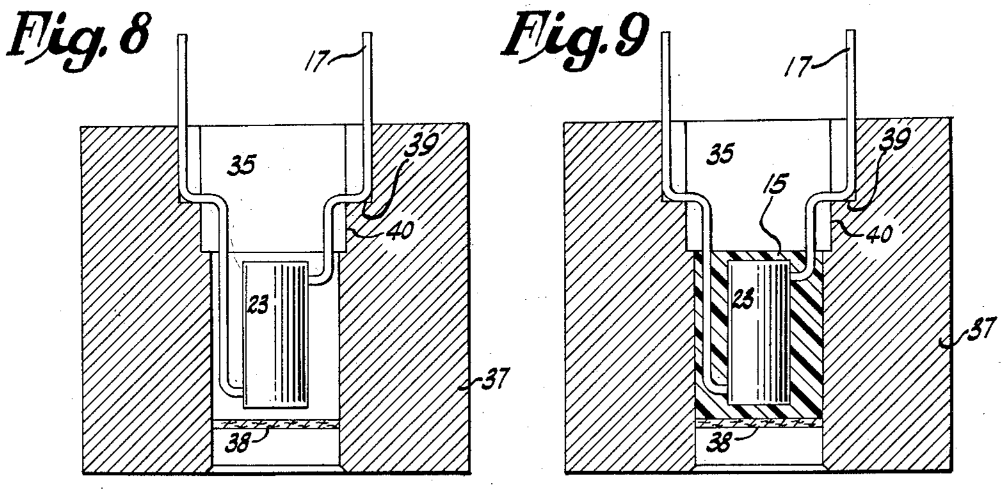
Figure 10:
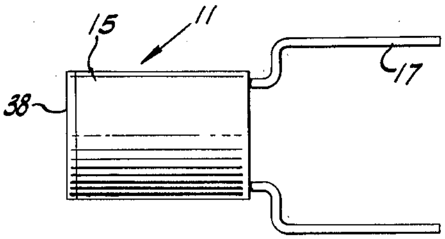
FIG. 10 illustrates the capacitor formed in accordance with the process illustrated in FIGS. 3 through 9 inclusive.

The condenser thus formed is completed from an electrical standpoint and needs only to be provided with the insulating and moisture proof casing 15. This casing may comprise, for instance, insulating tape or paper, or a cast shell as shown in FIG. 10. When casting capacitor 11, roll 23 is inserted into cavity 35 of mould 37 so that the roll and leads 17 adjacent the roll are spaced from the walls defining the cavity as indicated in FIG. 8. Roll 23 is suspended in the cavity by means of shoulders 33, which rest upon shelf 39. The abutting relationship between leads 17 and the sides of the shelf provide proper transverse spacing of roll 23 within the cavity. A plug 38, which may be made of cardboard, plastic, or metal, is frictionally held within one end of cavity 35. This plug is preferably punched from a strip of plug material (not shown), disposed beneath the cavity and is pushed into the cavity from this position. If desired, the plug can have the capacitor identification markings printed thereon. Plug 38 and roll 23 may be inserted into cavity 35 in any sequence or simultaneously.

When using an epoxy resin, it has been found desirable to have the resin heated to a moderate temperature, e.g. 120° F., to increase the viscosity thereof for purposes of pouring it into cavity 35 as shown in FIG. 9. The casing resin 15 extends up to the relief bore 40, which allows the upper surface of the casing to be formed with a convex meniscus. Preferably, the mould 37 is heated prior to the casting operation to a temperature of for example, 240° F., so that the resin poured into the cavity will harden faster. Most commercial casing resins harden or set at accelerated rates when heated beyond a given temperature. After hardening, the mould may be rapidly cooled to cause casing 15 to shrink relative to the cavity walls. Subsequently, capacitor 11 is press removed from the cavity in the direction of leads 17. Plug 38 adheres to the casing material and becomes an integral part thereof.

The application of the casting operation used in conjunction with the removable plug 38 provides a unique, simple, low cost and extremely fast process. For instance, the process can be completed within several minutes whereas previous full moulding operations took as long as an hour. Also, since the plug is removable with each capacitor, the mould mechanism is greatly simplified.

A capacitor formed in accordance with the invention is well adapted to automatic production techniques and does not require costly soldering or conductive gluing operations. In addition, the electrical lead 17 connections are mechanically strong and excellent from an electrical viewpoint. Since that part of leads 17 disposed adjacent roll 23 are inclosed in casing 15, the desired rigidity of the leads is increased to greatly facilitate capacitor mounting and lead connections.

Although several embodiments of the invention have been shown and described, it will be apparent to those skilled in the art that various changes and modifications may be made therein without departing from the scope of the invention as defined by the appended claims.

What is claimed is:

1. A tubular capacitor comprising a roll of laminae comprising at least two layers of dielectric material substantially coextensive in width with one of the side edges of each layer in substantially the same plane, a first conductive layer of less width than the width of dielectric material and having an edge in the plane of one of the side edges of the dielectric material, a second conductive layer underlying a layer of dielectrical material, of substantially the same width as the first conductive layer and having an edge in the plane of the opposite edges of the dielectric material; and wire conductors, one at each side edge of the dielectric material, each wire conductor passing through openings in both layers of dielectric material and one only of the conductive layers, said conductors being larger in area than the initial area of the openings in the layers and being in press fit relationship to the associated openings and in frictional contact with said dielectric material and conductive layer.

2. The subject matter of claim 1 and including an insulating casing enclosing the roll of laminae with the wire conductors extending through the casing.

3. The subject matter of claim 2 wherein one of the conductors extends at right angles to the axis of the capacitor and exteriorly along the length of the capacitor, within the casing, and to the exterior thereof, and wherein the other conductor extends similarly from the other end of the capacitor.

References Cited in the file of this patent

UNITED STATES PATENTS

| | | |
|---|---|---|
| 1,735,381 | Deutschmann | Nov. 12, 1929 |
| 1,811,067 | Valle | June 23, 1931 |
| 2,053,334 | Hetenyi | Sept. 8, 1936 |
| 2,887,649 | Peck | May 19, 1959 |
| 2,958,023 | Edwards | Oct. 25, 1960 |

FOREIGN PATENTS

| | | |
|---|---|---|
| 613,772 | Great Britain | Dec. 2, 1948 |
| 507,511 | Belgium | Dec. 15, 1951 |